US010236000B2

(12) United States Patent
Giletti

(10) Patent No.: US 10,236,000 B2
(45) Date of Patent: Mar. 19, 2019

(54) CIRCUIT AND METHOD FOR SPEECH RECOGNITION

(71) Applicant: DOLPHIN INTEGRATION, Meylan (FR)

(72) Inventor: Paul Giletti, Grenoble (FR)

(73) Assignee: DOLPHIN INTEGRATION, Meylan (FR)

( * ) Notice: Subject to any disclaimer, the term of this patent is extended or adjusted under 35 U.S.C. 154(b) by 27 days.

(21) Appl. No.: 15/654,153

(22) Filed: Jul. 19, 2017

(65) Prior Publication Data
US 2018/0025730 A1    Jan. 25, 2018

(30) Foreign Application Priority Data

Jul. 22, 2016 (FR) ..................................... 16 57034

(51) Int. Cl.
*G10L 15/20*     (2006.01)
*G10L 17/00*     (2013.01)
(Continued)

(52) U.S. Cl.
CPC .......... *G10L 17/005* (2013.01); *G10L 15/142* (2013.01); *G10L 15/16* (2013.01);
(Continued)

(58) Field of Classification Search
CPC ....................................................... G10L 15/20
(Continued)

(56) References Cited

U.S. PATENT DOCUMENTS 6,826,533 B2 * 11/2004 Burchard ................ G10L 15/22
704/270
9,026,443 B2 * 5/2015 Lenke ..................... G10L 15/22
704/251
(Continued)

FOREIGN PATENT DOCUMENTS

GB    2515526 A    12/2014

OTHER PUBLICATIONS

Atal et al., "A Pattern Recognition Approach to Voiced-Unvoiced-Silence Classification with Applications to Speech Recognition", IEEE Transactions on Acoustics, Speech and Signal Processing, Jun. 1976, pp. 201-212, vol. ASSP-24, No. 3.
(Continued)

*Primary Examiner* — Susan I McFadden
(74) *Attorney, Agent, or Firm* — Kaplan Breyer Schwarz, LLP

(57) ABSTRACT

The invention concerns a circuit for speech recognition comprising: a voice detection circuit configured to detect, based on at least one input parameter, the presence of a voice signal in an input audio signal and to generate an activation signal on each voice detection event; a speech recognition circuit configured to be activated by the activation signal and to perform speech recognition on the input audio signal, the speech recognition circuit being further configured to generate an output signal indicating, based on the speech recognition, whether each voice detection event is true or false; and an analysis circuit configured to generate, based on the output signal of the speech recognition circuit, a control signal for modifying one or more of said input parameters.

8 Claims, 3 Drawing Sheets

(51) Int. Cl.
*G10L 15/14* (2006.01)
*G10L 15/16* (2006.01)
*G10L 25/84* (2013.01)
*G10L 25/78* (2013.01)
*G10L 15/02* (2006.01)

(52) U.S. Cl.
CPC ............. *G10L 15/20* (2013.01); *G10L 25/78* (2013.01); *G10L 25/84* (2013.01); *G10L 2015/025* (2013.01); *G10L 2025/783* (2013.01); *G10L 2025/786* (2013.01)

(58) Field of Classification Search
USPC ......................................................... 704/246
See application file for complete search history.

(56) References Cited

U.S. PATENT DOCUMENTS

| | | | | |
|---|---|---|---|---|
| 9,373,393 | B2* | 6/2016 | Kim | G11C 13/0033 |
| 9,502,028 | B2* | 11/2016 | Nandy | G10L 19/002 |
| 9,589,560 | B1* | 3/2017 | Vitaladevuni | G06K 9/6277 |
| 9,704,486 | B2* | 7/2017 | Basye | G10L 15/28 |
| 9,779,726 | B2* | 10/2017 | Hatfield | G10L 15/22 |
| 9,899,021 | B1* | 2/2018 | Vitaladevuni | G10L 15/142 |
| 9,959,887 | B2* | 5/2018 | Kuo | G10L 25/87 |
| 2002/0116186 | A1 | 8/2002 | Strauss et al. | |
| 2009/0055173 | A1 | 2/2009 | Sehlstedt | |
| 2011/0125497 | A1 | 5/2011 | Unno | |
| 2012/0221330 | A1 | 8/2012 | Thambiratnam et al. | |
| 2012/0239394 | A1 | 9/2012 | Matsumoto | |
| 2013/0185068 | A1 | 7/2013 | Tanaka et al. | |
| 2014/0163978 | A1 | 6/2014 | Basye et al. | |

OTHER PUBLICATIONS

Hinton et al., "Deep Neural Networks for Acoustic Modeling in Speech Recognition", IEEE Signal Processing Magazine, Nov. 2012, pp. 81-97.

Waibel et al., "Phoneme Recognition Using Time-Delay Neural Networks", IEEE Transactions on Acoustics, Speech, and Signal Processing, Mar. 1989, pp. 328-339, vol. 37, No. 3.

Jalil et al., Short-Time Energy, Magnitude, Zero Crossing Rate and Autocorrelation Measurement for Discriminating Voiced and Unvoiced segments of Speech Signals, ISBN: 978-1-4673-5613-8, 2013, pp. 208-212, IEEE.

* cited by examiner

CIRCUIT AND METHOD FOR SPEECH RECOGNITION

This application claims the priority benefit of French patent application number 16/57034, the content of which is hereby incorporated by reference in its entirety to the maximum extent allowable by law.

FIELD

The present disclosure relates to the field of audio devices using voice activity detection, and in particular to a circuit and method for voice recognition.

BACKGROUND

By reducing the power consumption of portable electronic devices it is possible to increase the battery life. In the case of audio devices configured to capture and process a voice signal, one technique that has been proposed for reducing power consumption is to use voice activity detection, such that certain processing circuits are only activated when the voice signal is present. At other times, these processing circuits can be powered down, thereby economising energy.

It is important to draw a distinction between voice detection and speech recognition. Voice detection is aimed at generating a Boolean signal indicating whether or not a voice signal is present. Speech recognition is the recognition of one or more words in a voice signal.

Speech recognition is far more complex than voice detection, and thus tends to be significantly more power consuming. Therefore, it has been proposed to only activate speech recognition when a voice signal is detected. However, a difficulty in existing solutions is that the reduction in power consumption is relatively low. On the one hand, if the voice detection algorithm is sufficiently accurate to only activate the speech recognition in cases where voice is really present, this generally means that the voice detection algorithm will be complex and thus have a relatively high power consumption. On the other hand, if the voice detection algorithm has low power consumption, this generally means it will have a relatively high rate of false positive outputs in order to maintain an adequate positive predictive value, meaning that speech recognition will be activated more often than necessary, also leading to relatively high power consumption.

SUMMARY

It is an aim of embodiments of the present description to at least partially address one or more difficulties in the prior art.

According to one aspect, there is provided a circuit for speech recognition comprising: a voice detection circuit configured to detect, based on at least one input parameter, the presence of a voice signal in an input audio signal and to generate an activation signal on each voice detection event; a speech recognition circuit configured to be activated by the activation signal and to perform speech recognition on the input audio signal, the speech recognition circuit being further configured to generate an output signal indicating, based on the speech recognition, whether each voice detection event is true or false; and an analysis circuit configured to generate, based on the output signal of the speech recognition circuit, a control signal for modifying one or more of said input parameters.

According to one embodiment, the analysis circuit is adapted to determine a first value representing a true detection rate indicating the rate of true detection events among the total number of detection events generated by the voice detection circuit.

According to one embodiment, the analysis circuit is configured to generate the control signal based on a comparison of the first value with a first threshold and/or on whether the first value is increasing or decreasing.

According to one embodiment, the analysis circuit is further configured to: generate a second value representing the total number of detection events generated by the voice detection circuit; and compare the second value with a second threshold and/or determine whether the second value is increasing or decreasing.

According to one embodiment, the analysis circuit is configured to modify the control signal to render the voice detection circuit more sensitive if the first threshold and/or the second threshold is not exceeded and/or if the first value and/or second value is decreasing.

According to one embodiment, the analysis circuit is configured to: generate a third value representing a false detection rate indicating the rate of false detection events among the total number of detection events generated by the voice detection circuit; and compare the third value with a third threshold and/or determine whether the third value is increasing or decreasing.

According to one embodiment, the analysis circuit is further configured to modify the control signal to render the voice detection circuit less sensitive if the second and/or third threshold is exceeded and/or if the third value is increasing.

According to one embodiment, each of the at least one input parameter is one of the following parameters: a parameter setting one or more cut-off frequencies of one or more filters of the voice detection circuit; a parameter setting one or more detection thresholds of the voice detection circuit; a parameter setting one or more energy computation periods; a parameter setting a threshold number of zero passages of the audio signal; a parameter setting one or more debounce times; and a parameter setting a weighting to be applied to the output signal of one or more sub-circuits of the voice detection circuit.

According to one embodiment, the speech recognition circuit is adapted to generate a further activation signal for activating one or more further circuits in response to a speech recognition event.

According to one embodiment, the speech recognition circuit is adapted to perform keyword recognition.

According to a further aspect, there is provided a method of speech recognition comprising: detecting, by a voice detection circuit based on at least one input parameter, the presence of a voice signal in an input audio signal; generating, by the voice detection circuit an activation signal on each voice detection event; activating a speech recognition circuit by the activation signal; performing, by the speech recognition circuit, speech recognition on the input audio signal; generating, by the speech recognition circuit, an output signal indicating, based on the speech recognition, whether each voice detection event is true or false; and generating, by an analysis circuit based on the output signal of the speech recognition circuit, a control signal for modifying one or more of said input parameters.

According to one embodiment, the method further comprises: generating, by the analysis circuit, a first value representing a true detection rate indicating the rate of true detection events among the total number of detection events generated by the voice detection circuit and/or a false detection rate indicating the rate of false detection events among the total number of detection events generated by the voice detection circuit; and generating, by the analysis circuit, the control signal based on a comparison of the first value with a first threshold value and/or on whether the first value is increasing or decreasing.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
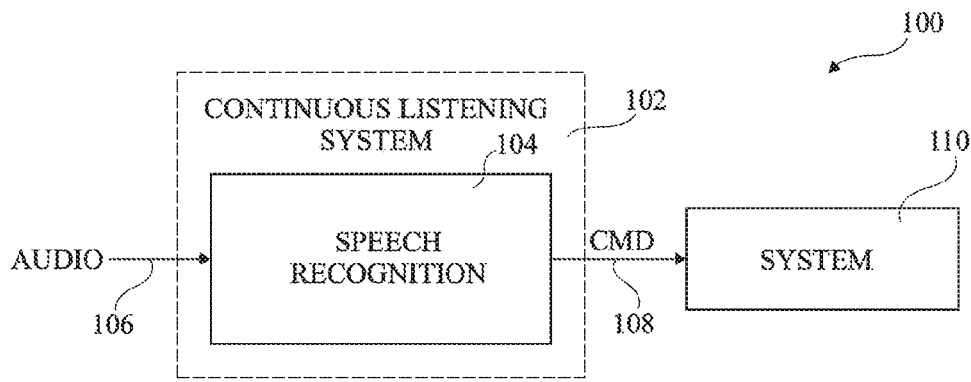
FIG. 1 schematically illustrates a speech recognition system according to an example embodiment.

FIG. 1 schematically illustrates a speech recognition system 100. The system 100 comprises a continuously active listening system (CONTINOUS LISTENING SYSTEM) 102, which comprises a speech recognition circuit (SPEECH RECOGNITION) 104 using a keyword-based speech recognition algorithm. The circuit 104 receives an audio stream (AUDIO) 106, and sends one or more command signals (CMD) on a line 108 when one or more keywords are recognized, the one or more command signals activating one or more further systems (SYSTEM) 110.

A drawback of the solution of FIG. 1 is that the keyword-based speech recognition circuit 104 is relatively complex and power consuming, and as it is continuously active, power consumption is likely to be relatively high.

Figure 2:
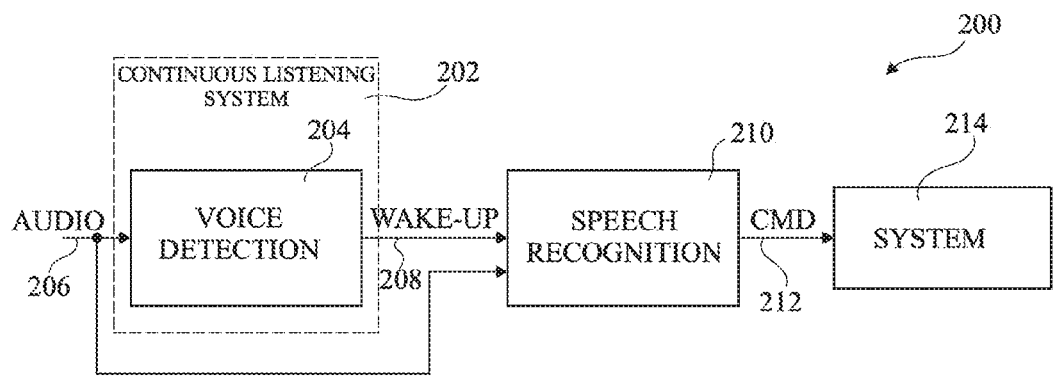
FIG. 2 schematically illustrates a speech recognition system according to yet a further example embodiment.

FIG. 2 schematically illustrates a speech recognition system 200 according to an alternative solution to that of FIG. 1. The system 200 comprises a continuously active listening system (CONTINOUS LISTENING SYSTEM) 202, which comprises a voice detection circuit (VOICE DETECTION) 204. The circuit 204 receives an audio stream (AUDIO) 206, and generates a wake-up signal (WAKE-UP) on a line 208 when a voice signal is detected. The wake-up signal activates a speech recognition circuit (SPEECH RECOGNITION) 210, which is based on keyword recognition. The circuit 210 also receives the audio stream (AUDIO), and generates one or more command signals (CMD) on a line 212 when a keyword is recognized, the one or more command signals activating one or more further systems (SYSTEM) 214.

While the solution of FIG. 2 provides the advantage that the speech recognition circuit 210 is only activated when a voice signal is detected, the power consumption may remain relatively high. Indeed, as explained in the background section above, if the voice detection circuit 204 is sufficiently accurate to only activate the speech recognition circuit 210 in cases where voice is really present, the voice detection circuit 204 is likely to be complex and thus have relatively high power consumption. If however the voice detection circuit 204 has low power consumption, this generally means it will have a relatively high rate of false positive outputs in order to maintain an adequate positive predictive value, meaning that the speech recognition circuit will be activated more often than necessary, also leading to relatively high power consumption.

Figure 3:
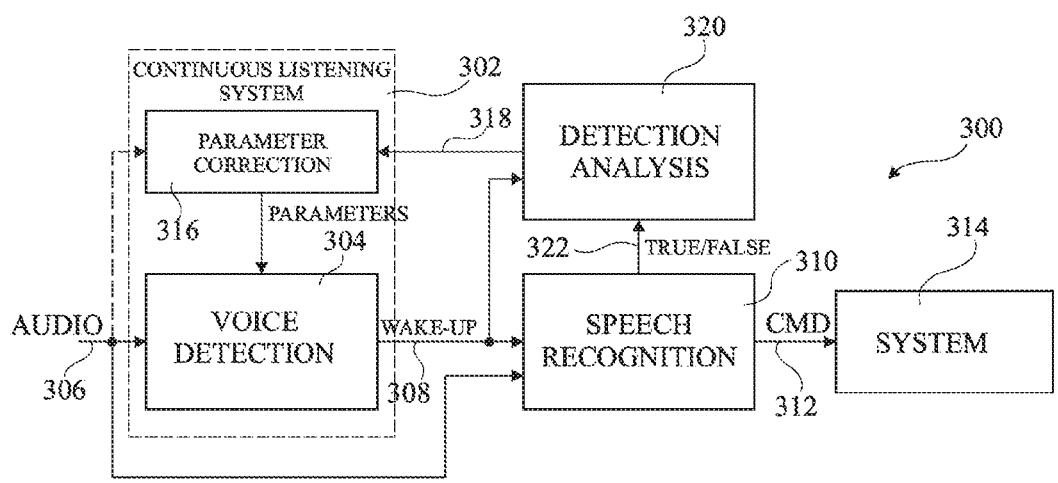
FIG. 3 schematically illustrates a speech recognition system according to an example embodiment of the present disclosure.

FIG. 3 schematically illustrates a speech recognition system 300 according to an example embodiment of the present disclosure. For example, the speech recognition system 300 forms part of an electronics device such as a mobile communications device, laptop or tablet computer, etc., capable of receiving voice commands, and the speech recognition system 300 is configured to distinguish from an audio signal a plurality of voice commands.

The system 300 for example comprises a continuously active listening system (CONTINOUS LISTENING SYSTEM) 302, which comprises a voice detection circuit (VOICE DETECTION) 304. The circuit 304 receives an audio signal (AUDIO) 306, which is for example generated by at least one transducer (not illustrated in the figures), which is for example a MEMS (micro electro-mechanical system). In some embodiments the audio signal is a digital signal, the output of the transducer for example being converted into a digital signal by an analog to digital converter. Alternatively, the audio signal could be an analog signal.

The circuit 304 for example generates a wake-up signal (WAKE-UP) on a line 308 when a voice signal is detected. The wake-up signal activates a speech recognition circuit (SPEECH RECOGNITION) 310, which for example includes keyword recognition. Speech recognition implies the recognition in a voice signal of one or more spoken words of a given language. Keyword recognition for example involves the recognition of one or more keywords from a relatively reduced set of words when compared to the dictionaries used during speech recognition in general. For example, keyword recognition based on speech recognition can be implemented using Hidden Markov models and neural networks. This is for example described in more detail in the publication by A. Waibel entitled "Phoneme recognition using time-delay neural networks", and in the publication by Geoffrey Hinton entitled "Deep Neural Networks for Acoustic Modeling in Speech Recognition: the Shared Views of Four Research groups", the contents of these two publications being hereby incorporated by reference to the extent permitted by the law.

For example, the keyword recognition algorithm is adapted to detect in the audio signal one or more spoken keywords, which for example correspond to voice commands. The circuit 310 also receives the audio signal (AUDIO) 306, and generates an interrupt request signal (CMD) on a line 312 when voice is recognized, the interrupt request signal activating one or more further systems (SYSTEM) 314.

The continuous listening system 302 further comprises a parameter correction circuit (PARAMETER CORRECTION) 316 configured to provide one or more modified parameters (PARAMETERS) to the voice detection circuit 304. The voice detection algorithm applied by the circuit 304 is for example based at least partially on one or more of the following parameters:

one or more parameters indicating one or more cut-off frequencies of a low pass or band pass filter, wherein the cut-off frequency is for example the frequency at which the signal amplitude falls to less than 20 percent of its peak value;

one or more parameters indicating one or more detection thresholds;

one or more parameters indicating a threshold number of zero passages of the audio signal. For example, voice detection based on zero crossing is described in more detail in the publication by Madiha Jalil et al. entitled "Short-time energy, zero crossing rate and autocorrelation measurement for discriminating voiced and unvoiced seyments of speech signal", 2013 International Conference on Technological Advances in Electrical, Electronics and Computer Engineering (TAEECE), and in the publication by B. Atal entitled "A pattern recognition approach to voiced-unvoiced-silence classification with applications to speech recognition", IEEE Transactions on Acoustics Speech and Signal Processing, 24(3):201-212, June 1976;

one or more parameters indicating one or more debouncing times. As known by those skilled in the art, a debouncing function prevents a further triggering of an event within a certain "debouncing time" of a first event; and one or more parameters indicating a weighting applied to the output signal of one or more sub-circuits when generating the result of the detection decision.

Voice detection algorithms based on at least one of the above parameters are known in the art and are for example discussed in more detail in the United States Patent applications published as US20090055173, US20110125497 and US20020116186, the contents of which is hereby incorporated by reference to the extent permitted by the law.

As a simple example, the voice detection circuit 304 for example comprises a low pass filter adapted to filter the input audio signal, the low pass filter for example having a cut-off frequency of between 15 and 20 kHz. Additionally, the voice detection circuit 304 for example comprises a comparator adapted to apply a detection threshold to the filtered audio signal, such that only an audio signal above a certain threshold triggers a detection event. In some embodiments, the cut-off frequency of the low pass filter and/or the detection threshold are the parameters of the detection circuit.

The parameter correction circuit 316 for example determines a modification to be applied to the parameters based on a control signal provided on a line 318 from a detection analysis circuit (DETECTION ANALYSIS) 320. The circuit 320 for example in turn receives the wake-up signal generated by the voice detection circuit 304 on the line 308, and an indication on a line 322 of the true or false status (TRUE/FALSE) of each voice detection event provided by the keyword recognition circuit 310.

The analysis circuit 320 is for example capable of determining, for each detection event indicated by the wake-up signal on the line 308, whether or not the speech recognition circuit 310 detected speech, which in turn indicates whether the detection event was true or false. In some embodiments, the analysis circuit 320 generates and provides to the parameter correction circuit 316 one or more of:

the true detection rate, for example calculated as an average value over a sliding time window, or based on the number of true detection events as a fraction of the total number of detection events over a given time period;

the false detection rate, for example calculated as an average value over a sliding time window, or based on the number of false detection events as a fraction of the total number of detection events over a given time period; and the total number of detection events over a given period, for example an average number of detection events or the derivative of this average.

In some embodiments, the parameter correction circuit is configured to update one or more of the parameters based on a comparison of the true, false and/or total detection rate with a threshold value, and/or based on whether the true, false and/or total detection rate is increasing or decreasing.

Figure 4:
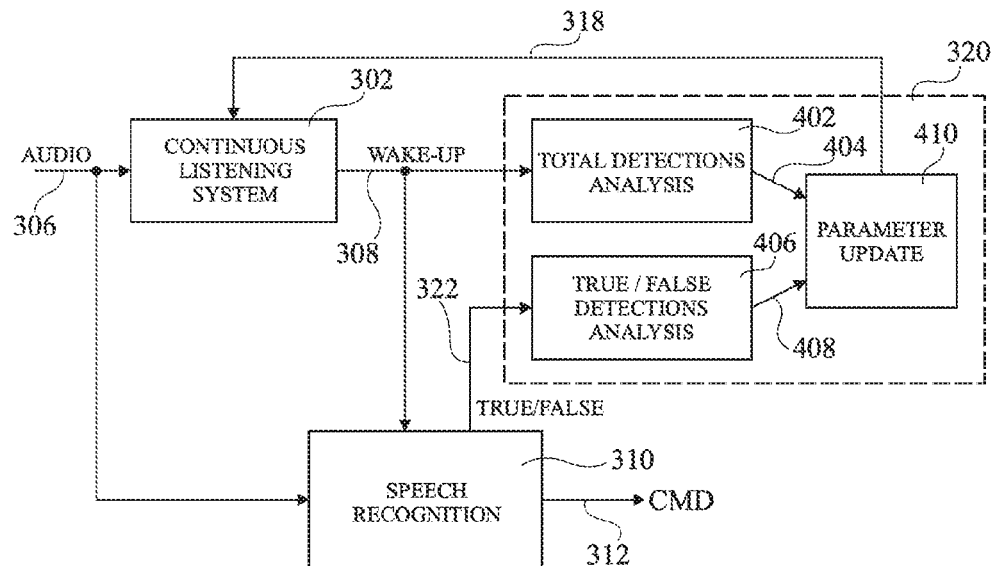
FIG. 4 schematically illustrates the speech recognition system of FIG. 3 in more detail according to an example embodiment.

FIG. 4 schematically illustrates part of the speech recognition system 320 of FIG. 3 in more detail, and in particular illustrates the detection analysis circuit 320 in more detail. The detection analysis circuit 320 for example comprises a total detections analysis circuit (TOTAL DETECTIONS ANALYSIS) 402, which for example counts detection events based on the wake-up signal on line 308, and for example provides a detected event rate on an output line 404. The analysis circuit 320 also for example comprises a true/false detections analysis circuit (TRUE/FALSE DETECTIONS ANALYSIS) 406, which for example counts true and/or false detection events based on the output line 322 of the speech recognition circuit 310, and for example provides a true and/or false detection rate on an output line 408.

The total detection rate and the true and/or false detection rate are for example provided to a parameter update circuit (PARAMETER UPDATE) 410, which for example generates the parameter control signal on the line 318 to the continuous listening system 302.

Operation of the circuit of FIG. 4 will now be described in more detail with reference to FIG. 5.

Figure 5:
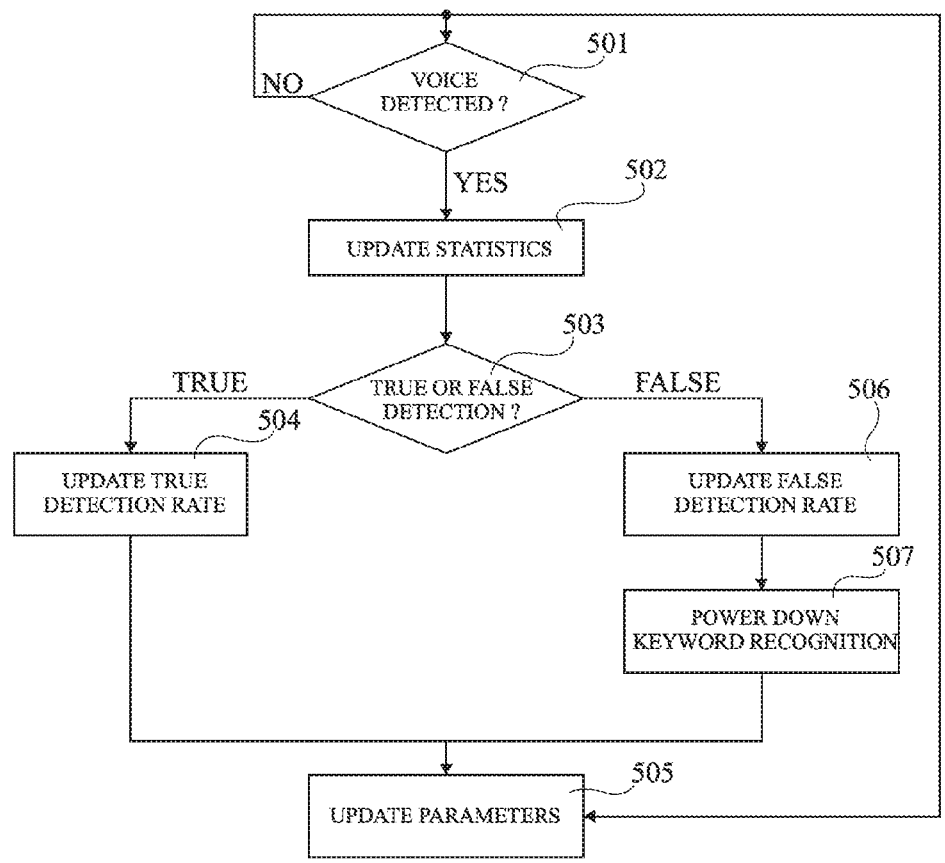
FIG. 5 is a flow diagram illustrating operations in a method of speech recognition according to an example embodiment of the present disclosure.

FIG. 5 is a flow diagram illustrating operations in a method of speech recognition according to an example embodiment of the present disclosure.

The method starts at an operation 501 in which it is determined whether a voice detection event has occurred, in other words whether the detected audio signal is interpreted as a voice signal. If not, operation 501 is repeated such that there is a continuous listening of the input audio signal. If a voice detection event occurs, the next operation is 502.

In operation 502, statistics concerning the detected events are for example updated. For example a total detection events rate and/or a true and/or false detection rate are updated based on the detection event and on the true/false output signal of the speech recognition circuit 310 in response to the detection event.

In an operation 503, it is then determined whether the detected event was true or false, in other words whether it truly or falsely corresponded to speech. For example, in some embodiments the detection by the speech recognition circuit 310 of any recognizable word in the audio signal indicates a true detection event, whereas the detection by the speech recognition circuit 310 of no recognizable word within a given time window indicates a false detection event.

In the case of a true detection event in operation 503, the next operation is for example 504, in which the true detection rate is for example updated. In an operation 505, at least one parameter used for the voice detection is for example updated based on the updated statistics.

In the case of a false detection event in operation 503, the next operation is for example 506, in which the false detection rate is for example updated, and then in an operation 507, the keyword detection algorithm is for example powered down, for example by powering down the speech recognition circuit 310. The method then for example goes to operation 505 in which again at least one parameter used for the voice detection is for example updated based on the updated statistics.

The operation 505 for example involves, for a given detection parameter, applying the following algorithm:

IF the true detection rate is under a first defined threshold OR IF the total detection rate is under a second defined threshold, THEN the detection threshold parameter is modified in order to increase the detection sensitivity of the continuous listening system;

ELSE IF the false detection rate is above the first defined threshold or a further threshold AND IF it is increasing AND IF the total detection rate is above the second defined threshold or a further threshold, THEN the detection threshold parameter is modified in order to reduce the sensitivity of the continuous listening system.

The decreasing/increasing commands can be proportional to the variation of the detection rates or to the difference between the detection rates and the defined thresholds.

In the case of a detection parameter defining the threshold number of zero passages, the above algorithm can be applied, except that a relative threshold is for example used, such that the detection decision is made based on the variation of the Zero Crossing Rate.

In some embodiments, the different thresholds are weighted, and the commands to increase or decrease the parameters are applied to all parameters or follow a specific priority order.

After operation 505, the method for example returns to operation 501.

Figure 6:
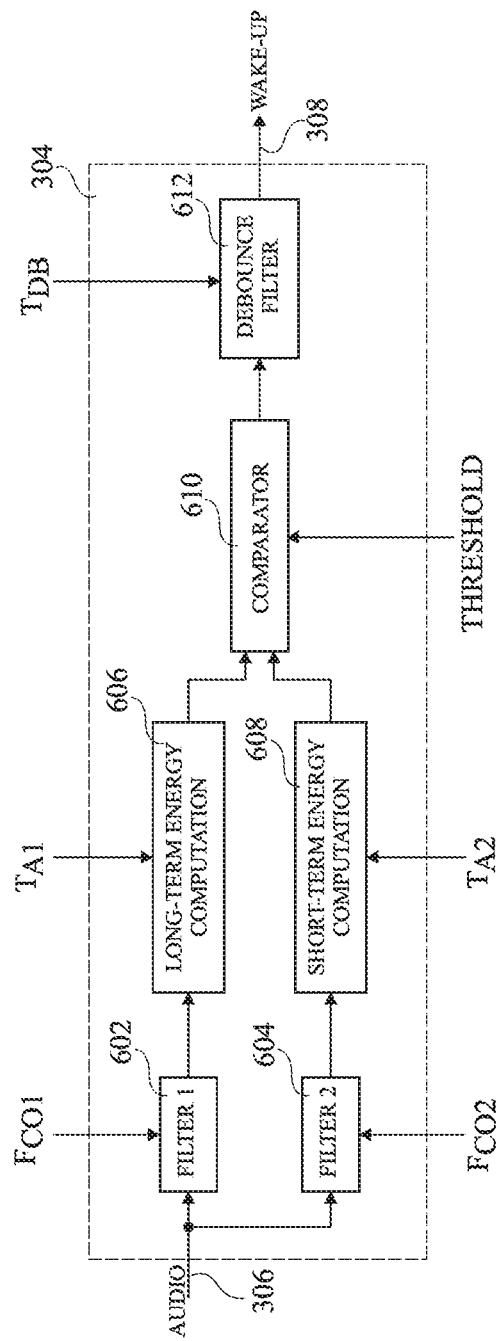
FIG. 6 schematically illustrates a voice detection circuit according to an example implementation.

FIG. 6 schematically illustrates the voice detection circuit 304 of the continuous listening system according to an example embodiment.

The audio signal AUDIO on the line 306 is for example provided in parallel to filters (FILTER 1) 602 and (FILTER 2) 604 controlled respectively by parameters $F_{CO1}$, $F_{CO2}$, controlling at least one cut-off frequency of the filter. The cut-off frequency is for example the frequency at which the output signal of the filter falls to or rises to at least 50 percent of its peak. In some embodiments, each of the filters 602, 604 has a high cut-off frequency of around 4 kHz. Alternatively, the filter 602 has a high cut-off frequency $F_{CO1}$ of around 20 kHz, and the filter 604 has low and high cut-off frequencies of 200 Hz and 4 kHz respectively, defining a pass-band.

The output of the filter 602 is for example coupled to a long term energy computation circuit (LONG-TERM ENERGY COMPUTATION) 606 and the output of the filter 604 is for example coupled to a short-term energy computation circuit (SHORT-TERM ENERGY COMPUTATION) 608. The circuits 606 and 608 are respectively controlled by parameters $T_{A1}$, $T_{A2}$ defining the duration of the energy computation periods. The long-term computation circuit 606 generates a signal representative of the total energy level of audio signal, including background noise. The short-term computation circuit 608 generates a signal representative of energy fluctuations resulting for example from a voice signal. The outputs of the circuits 606 and 608 are for example coupled to a comparator (COMPARATOR) 610, which compares the difference between the signals with a threshold parameter THRESHOLD. If the difference is greater than the threshold, an event is triggered at the output of the comparator, and this signal is for example coupled to a debounce filter (DEBOUNCE FILTER) 612, which for example prevents repeated events within a certain debounce time defined by a further parameter $T_{DB}$. The output of the debounce filter 612 for example provides the wake-up signal on the line 308.

One or more of the parameters $F_{CO1}$, $F_{CO2}$, $T_{A1}$, $T_{A2}$, THRESHOLD and $T_{DB}$ are for example generated by the parameter correction circuit 316 of FIG. 3 in order to modify the sensitivity of the voice detection circuit.

Of course, the circuit of FIG. 6 provides just one example, and in alternative embodiments alternative circuits could be used which for example comprise additional circuits and/or omit circuits with respect to the embodiment of FIG. 6.

An advantage of the embodiments described herein is that the accuracy of a relatively simple voice detection algorithm can be improved by modifying one or more parameters of the voice detection algorithm based on the result of speech recognition.

Another advantage of the embodiments described herein is that a relatively simple voice detection system can be automatically calibrated to different usage conditions.

In this way, a relatively low power voice detection circuit can be provided that has a relatively low rate of false positive events, thereby preventing high consumption by the speech recognition circuit.

Having thus described at least one illustrative embodiment, various alterations, modifications and improvements will readily occur to those skilled in the art. For example, it will be apparent to those skilled in the art that while particular examples of the parameters applied to the voice detection circuit have been provided, there are other parameters that could additionally or alternatively be applied.

The invention claimed is:

1. A circuit for speech recognition comprising:
   a voice detection circuit configured to detect, based on at least one input parameter, the presence of a voice signal in an input audio signal and to generate an activation signal on each voice detection event;
   a speech recognition circuit configured to be activated by the activation signal and to perform speech recognition on the input audio signal, the speech recognition circuit being further configured to generate an output signal indicating, based on the speech recognition, whether each voice detection event is true or false; and
   an analysis circuit configured to:
   generate a first value representing a true detection rate indicating the rate of true detection events among the total number of detection events generated by the voice detection circuit and/or a second value representing a false detection rate indicating the rate of false detection events among the total number of detection events generated by the voice detection circuit; and
   generate a control signal for modifying one or more of said input parameters based on a comparison of the first value with a first threshold or of the second value with a second threshold and/or based on whether the first or second value is increasing or decreasing.

2. The circuit of claim 1, wherein the analysis circuit is further configured to:
   generate a third value representing the total number of detection events generated by the voice detection circuit; and
   compare the third value with a third threshold and/or determine whether the third value is increasing or decreasing.

3. The circuit of claim 2, wherein the analysis circuit is configured to modify the control signal to render the voice detection circuit more sensitive if the first threshold and/or the third threshold is not exceeded and/or if the first value and/or third value is decreasing.

4. The circuit of claim 3, wherein the analysis circuit is further configured to modify the control signal to render the voice detection circuit less sensitive if the second and/or third threshold is exceeded and/or if the second value is increasing.

5. The circuit of claim 1, wherein each of the at least one input parameter is one of the following parameters:
   a parameter setting one or more cut-off frequencies of one or more filters of the voice detection circuit;
   a parameter setting one or more detection thresholds of the voice detection circuit;
   a parameter setting one or more energy computation periods;
   a parameter setting a threshold number of zero passages of the audio signal;
   a parameter setting one or more debounce times; and
   a parameter setting a weighting to be applied to the output signal of one or more sub-circuits of the voice detection circuit.

6. The circuit of claim 1, wherein the speech recognition circuit is adapted to generate a further activation signal for activating one or more further circuits in response to a speech recognition event.

7. The circuit of claim 6, wherein the speech recognition circuit is adapted to perform keyword recognition.

8. A method of speech recognition comprising:
   detecting, by a voice detection circuit based on at least one input parameter, the presence of a voice signal in an input audio signal;
   generating, by the voice detection circuit an activation signal on each voice detection event;
   activating a speech recognition circuit by the activation signal;
   performing, by the speech recognition circuit, speech recognition on the input audio signal;
   generating, by the speech recognition circuit, an output signal indicating, based on the speech recognition, whether each voice detection event is true or false;
   generating, by the analysis circuit, a first value representing a true detection rate indicating the rate of true detection events among the total number of detection events generated by the voice detection circuit and/or a second value representing a false detection rate indicating the rate of false detection events among the total number of detection events generated by the voice detection circuit; and
   generating, by an analysis circuit, a control signal for modifying one or more of said input parameters based on a comparison of the first value with a first threshold value or of the second value with a second threshold value and/or on whether the first or second value is increasing or decreasing.

* * * * *